(12) United States Patent
Rinn

(10) Patent No.: US 12,509,256 B2
(45) Date of Patent: Dec. 30, 2025

(54) METHOD FOR OPERATING A FLOW-WRAPPING MACHINE

(71) Applicant: ROVEMA GMBH, Fernwald (DE)

(72) Inventor: Markus Rinn, Pohlheim (DE)

(73) Assignee: ROVEMA GMBH, Fernwald (DE)

( * ) Notice: Subject to any disclaimer, the term of this patent is extended or adjusted under 35 U.S.C. 154(b) by 0 days.

(21) Appl. No.: 18/561,523

(22) PCT Filed: May 4, 2022

(86) PCT No.: PCT/EP2022/061918
§ 371 (c)(1),
(2) Date: Nov. 16, 2023

(87) PCT Pub. No.: WO2022/243033
PCT Pub. Date: Nov. 24, 2022

(65) Prior Publication Data
US 2024/0246704 A1 Jul. 25, 2024

(30) Foreign Application Priority Data

May 18, 2021 (DE) ..................... 10 2021 112 794.7

(51) Int. Cl.
| | |
|---|---|
| *B65B 9/207* | (2012.01) |
| *B29C 65/00* | (2006.01) |
| *B65B 9/22* | (2006.01) |
| *B65B 51/30* | (2006.01) |
| *B65B 61/06* | (2006.01) |

(52) U.S. Cl.
CPC .......... *B65B 9/207* (2013.01); *B29C 66/4312* (2013.01); *B29C 66/4322* (2013.01);
(Continued)

(58) Field of Classification Search
CPC ........... B65B 9/207; B65B 9/22; B65B 51/30; B65B 61/06; B29C 66/4312;
(Continued)

(56) References Cited

U.S. PATENT DOCUMENTS

| | | | | |
|---|---|---|---|---|
| 4,063,400 A | * | 12/1977 | Millevoi | ................ B65B 51/30 53/77 |
| 4,574,566 A | | 3/1986 | Eaves | |

(Continued)

FOREIGN PATENT DOCUMENTS

| | | |
|---|---|---|
| DE | 3435948 A1 | 4/1986 |
| DE | 69101182 T2 | 5/1994 |

(Continued)

*Primary Examiner* — Sameh Tawfik
(74) *Attorney, Agent, or Firm* — Dickinson Wright PLLC; Andrew D. Dorisio

(57) ABSTRACT

A method for operating a tubular bag machine having a film web capable of unwinding from a supply reel, a shoulder for forming the web into a film tube, a take-off unit serving to move the tube, a longitudinal sealing device for welding the tube parallel to its transport direction by a longitudinal seam, a sealing device with jaws for producing transverse seams in the tube, a separating element for separating finished tubular bags from the tube, the machine being accelerated in a positive acceleration phase from an initial speed to a target speed when starting or being decelerated in a negative acceleration phase from the target speed to a final speed for stopping, wherein, in the positive acceleration phase and/or in the negative acceleration phase, at least one sealing parameter of the jaws for producing tubular bags changes as a function of the conveying speed of the web.

11 Claims, 2 Drawing Sheets

(52) U.S. Cl.
CPC .. *B29C 66/72328* (2013.01); *B29C 66/83221* (2013.01); *B29C 66/849* (2013.01); *B29C 66/872* (2013.01); *B29C 66/91421* (2013.01); *B29C 66/91441* (2013.01); *B29C 66/92441* (2013.01); *B29C 66/93441* (2013.01); *B29C 66/9441* (2013.01); *B65B 9/22* (2013.01); *B65B 51/30* (2013.01); *B65B 61/06* (2013.01)

(58) Field of Classification Search
CPC .......... B29C 66/4322; B29C 66/72328; B29C 66/83221; B29C 66/849; B29C 66/872; B29C 66/91421; B29C 66/91441; B29C 66/92441; B29C 66/93441; B29C 66/6441
USPC .......................................................... 53/450
See application file for complete search history.

(56) References Cited

U.S. PATENT DOCUMENTS

| | | | | |
|---|---|---|---|---|
| 5,329,745 | A | | 7/1994 | Suga |
| 5,653,085 | A | * | 8/1997 | Suga ................. B29C 66/91212 53/550 |
| 5,675,958 | A | * | 10/1997 | Shanklin ............... B65B 51/303 53/550 |
| 5,689,942 | A | * | 11/1997 | Suga ...................... B65B 9/067 53/374.6 |
| 2015/0047296 | A1 | | 2/2015 | Schneider |
| 2015/0298391 | A1 | | 10/2015 | Brunnecker et al. |

FOREIGN PATENT DOCUMENTS

| | | | | |
|---|---|---|---|---|
| DE | 19620560 A1 | | 11/1997 | |
| DE | 69510900 T2 | | 12/1999 | |
| DE | 102010028697 B3 | | 11/2011 | |
| DE | 102011006506 A1 | | 5/2012 | |
| DE | 102011006506 B4 | * | 11/2013 | ............. B29C 65/08 |
| DE | 102014221352 A1 | | 5/2015 | |
| DE | 102017121572 A1 | | 3/2018 | |
| DE | 102007003930 B4 | * | 1/2021 | ............. B29C 65/02 |
| JP | H09175517 A | | 7/1997 | |
| JP | 2011207056 A | | 10/2011 | |
| JP | 2012126447 A | | 7/2012 | |

* cited by examiner

METHOD FOR OPERATING A FLOW-WRAPPING MACHINE

TECHNICAL FIELD

The invention relates to a method for operating a tubular bag machine.

BACKGROUND

A generic tubular bag machine is known from DE 10 2010 028 697 A1, for example. The tubular bag machine can be a tubular bag machine which operates vertically or horizontally such that the tubular bags are conveyed either vertically or horizontally through the tubular bag machine.

Different film materials are known for the production of tubular bags. With regard to an easy processing, in particular plastic films are common for the production of tubular bags. These plastic films can in particular also be multilayer films in which the different layers of the film material are optimized with regard to the processing, in particular with regard to the sealing of the film web. Plastic films of this kind typically have a high tear resistance and can, therefore, also be processed in the tubular bag machine at high manufacturing speeds without any problem.

In order to enable a sparing resource consumption, film materials, which allow a sustainable and resource-sparing use of materials, are increasingly used for the production of tubular bags. In particular film materials, which have a high paper proportion, are increasingly used for the production of tubular bags. This paper material has in particular the advantage that it can be recycled with a high reuse percentage with known recycling systems, for example by using paper bins.

The disadvantage of these sustainable film materials is that they have a considerably low tear resistance. This low tear resistance of the film material requires that a positive and negative acceleration phase have to be travelled through when starting and stopping the tubular bag machine, respectively, in said positive and negative acceleration phase, the tubular bag machine being accelerated from an initial speed, for example from the standing position, to the desired target speed and being decelerated from the target speed to a final speed, for example to the stand, respectively. Due to this positive and/or negative acceleration phase, the mechanical stress of the film web can be limited to a degree which reliably precludes a tearing of the film web. The relatively long acceleration phase when starting and decelerating the tubular bag machine however entails that the tubular bags do not have the necessary sealing quality during the positive and negative acceleration phase, respectively. This is in particular a great disadvantage when the acceleration phase is relatively long such that a relatively large number of tubular bags is produced as rejects.

Taking this state of the art as a basis, it is therefore the object of the present invention to propose a new method for operating a tubular bag machine, said method enabling the production of tubular bags with a sufficient sealing quality also during the positive and/or negative acceleration phase.

SUMMARY

Advantageous embodiments of the invention are the subject matter of the dependent claims.

The method according to the invention is based on the idea that, in the positive and/or negative acceleration phase, at least one sealing parameter of the transverse jaws for producing tubular bags is changed as a function of the current conveying speed of the film web. This is because the changing conveying speed of the film web during the positive and/or negative acceleration phase causes an undesirable influence on the sealing parameters such that the sealing quality can be obtained only by a corresponding change of the sealing parameters during the acceleration phase.

The sealing quality of the transverse sealed seams is influenced by a plurality of parameters. The sealing time during which the transverse jaws are in contact with the sealing web is of particular importance for the sealing quality. If the film web has a considerably lower speed than the target speed during the positive and/or negative acceleration phase, thereby, when movement kinematics remain the same, an undesirable increase of the sealing time can result due to which the sealing zone burns and thereby has an insufficient sealing quality.

Alternatively or additively to the sealing time, also the sealing path along which the transverse jaws are in contact with the sealable web can be changed as a function of the current conveying speed of the film web. If the film web moves at high speed, in particular at a target speed desired according to the predefined cycle time, a correspondingly long sealing path is required in order to introduce the necessary heat into the sealing zone of the film material by means of the transverse jaws. If the film web has a low conveying speed, as it is in particular the case in the positive and/or negative acceleration phase, the sealing path has to be correspondingly shortened in order to avoid an excessive heat input of the transverse jaws into the sealing zone. Alternatively or additively to the sealing time and/or the sealing path, the sealing temperature with which the film web is sealed by the transverse jaws can also be changed as a function of the current conveying speed of the film web. Again, thereby, the heat input of the transverse jaws into the film material can be varied as a function of the speed of the film web in such a manner that a burning of the film material is prevented. Furthermore, it is also possible to change the sealing pressure with which the film web is sealed by the transverse jaws as a function of the current conveying speed of the film web.

In order to achieve a sufficient sealing quality in the transverse sealed seam, the film manufacturer usually specifies optimized sealing parameters from which it is possible to deviate only within a relatively small tolerance. In order to ensure the sealing quality also when starting and/or decelerating the tubular bag machine at any time, it is in this respect particularly advantageous if at least one sealing parameter of the transverse jaws for producing transverse seams is changed as a function of the current conveying speed of the film web in such a manner that the energy input of the transverse jaws into the transverse seams remains essentially constant. Thus, if, for example, the conveying speed of the film web is reduced, the sealing path of the transverse jaws also has to be shortened during transverse sealing since, otherwise, when the sealing path remains the same, an excessive amount of heat is introduced into the sealing zone.

A particularly simple method variant results if the sealing pressure and/or the sealing temperature remain unchanged in the positive and/or negative acceleration phase. This is because this sealing parameters can be changed only with relatively high effort in known tubular bag machines. In order to keep the heat input into the sealing zone during the acceleration phases largely constant, it is however particularly easy, to change the sealing path as a function of the current conveying speed of the film web in such a manner that the effective sealing time remains essentially constant. In particular, the sealing path can be changed in linear dependence on the current conveying speed of the film web. That means that the sealing path is extended to twice the length at twice the conveying speed, for example.

The method according to the invention provides a particularly great advantage in the continuous production of tubular bags. In particular, with this method according to the invention, a film web having a high proportion of paper can be processed although these paper films have a lower tear resistance and can be optimally sealed within a parameter window. In particular, the method according to the invention allows the processing of film webs having a proportion of at least 95% paper without any problem.

BRIEF DESCRIPTION OF THE DRAWINGS

An embodiment of the invention is schematically illustrated in the drawings and will be explained in an exemplary manner below.

In the figures.

DETAILED DESCRIPTION

Figure 1:
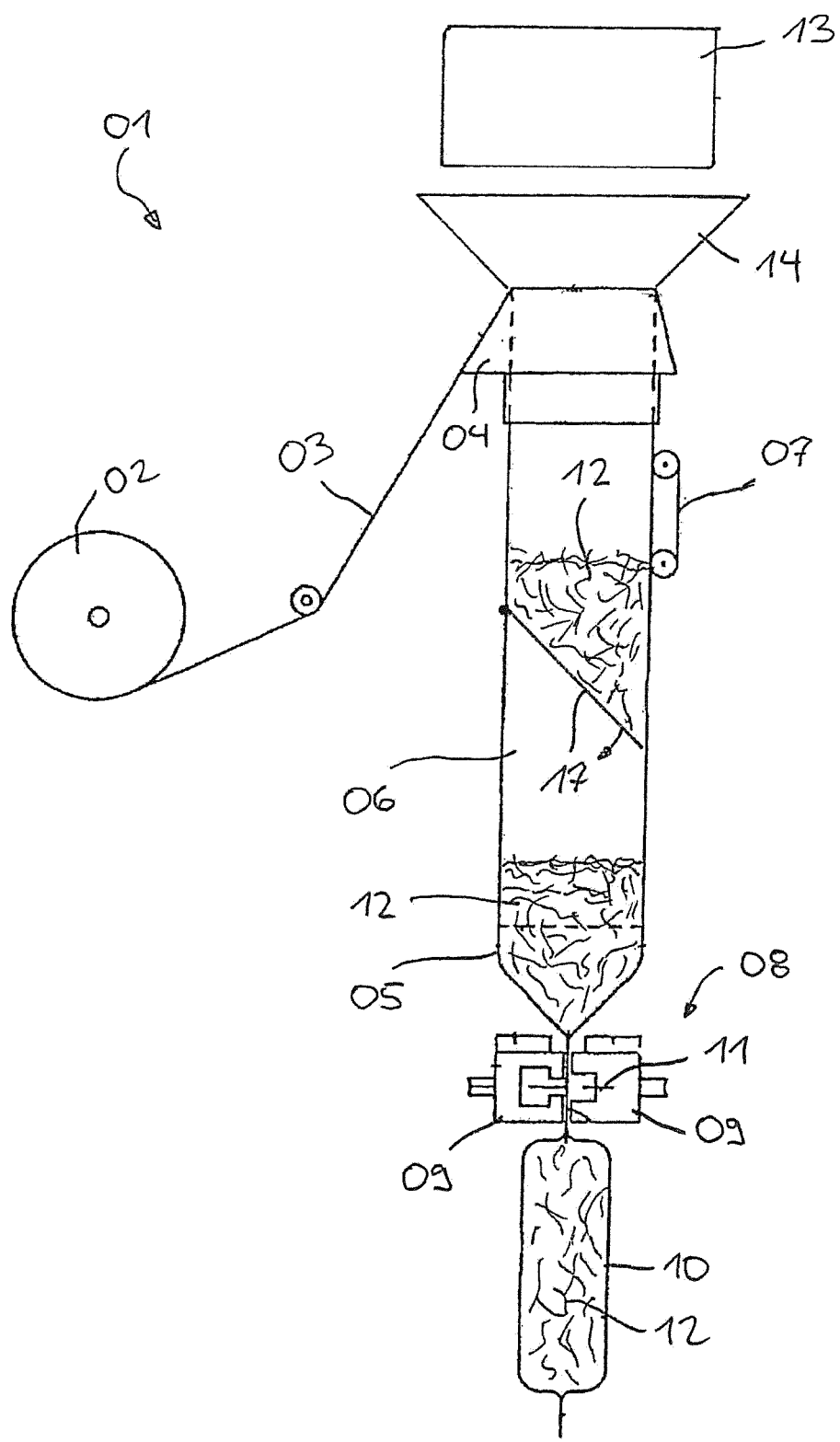
FIG. 1 shows the cross section of a schematically illustrated tubular bag machine when performing the method according to the invention.

FIG. 1 shows a schematically illustrated tubular bag machine 01, in FIG. 1, only the parts of tubular bag machine 01 being illustrated which are required for understanding the invention. A film web 03 is unwound from a supply reel 02 and subsequently formed into a film tube 05 at a forming shoulder 04. Film web 03 is a paper web which is coated with a sealing layer, the paper proportion being higher than 95%.

Driven by a film take-off unit 07, film tube 05 slides down on the outside of a forming tube 06, film tube 05 being longitudinally sealed parallel to its transport direction by means of a longitudinal sealing device not illustrated in FIG. 1. The conveying speed of film web 03 is monitored by means of a corresponding sensor technology.

Below forming tube 06 is a transverse sealing device 08 having two transverse jaws 09 for producing transverse seams, film tube 05 being transversely welded into individual tubular bags 10 by means of said transverse sealing device 08. A separating element 11 with which individual tubular bags 10 can be separated from one another after the transverse welding is integrated in transverse jaw 09.

Filling material 12 for filling tubular bags 10 is measured with a measuring device, for example scales 13, in such a manner that the filling quantity intended for one tubular bag 10 is achieved in each case. The measured filling material 12 falls through an opening impulse of scales 13 into funnel 14 underneath it. By means of funnel 14, filling material 12 is brought together to the diameter of forming tube 06.

The production of tubular bags 10 in tubular bag machine 01 is carried out continuously and at a high number of cycles, this means at a very high target speed. Thus, when starting and decelerating tubular bag machine 01, film web 03 first has to be strongly accelerated from the standing position and strongly decelerated, respectively. In this case, in order to prevent a tearing of film web 03, the acceleration and the deceleration has to be limited to a maximum in order to keep the forces occurring during the acceleration and deceleration, respectively, below a tolerable level. This leads to a relatively long positive and/or negative acceleration phase.

Figure 2:
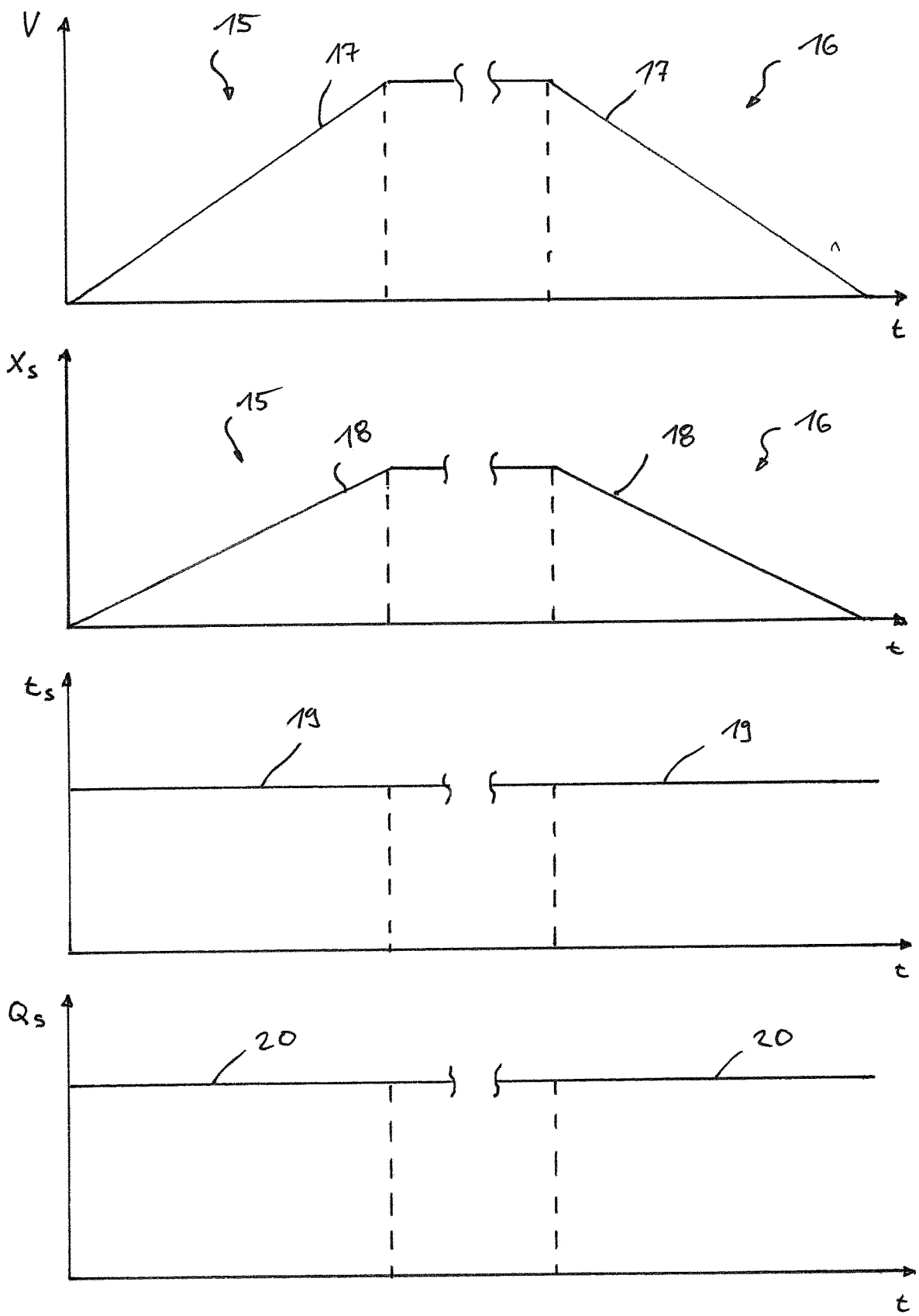
FIG. 2 shows four different sealing parameters for the transverse sealing of the tubular bags in the tubular bag machine according to FIG. 1 when performing the method according to the invention.

In FIG. 2, four process parameters of tubular bag machine 01 during positive and/or negative acceleration phase 15 and 16 are schematically illustrated. In this case, in the same order from the top, conveying speed 17 (V) of film web 03, sealing path 18 (Xs) of transverse jaws 09, sealing time 19 (Ts) and amount of heat 20 introduced into film web 03 during transverse sealing are illustrated as process parameters.

In the uppermost diagram of FIG. 1 showing conveying speed 17 of film web 03, it can be seen that conveying speed 17 in positive acceleration phase 15 is accelerated from the standing position to the predefined target speed along a linear ramp. Conversely, then, in negative acceleration phase 16, conveying speed 17 of film web 03 is decelerated from the target speed along a linear ramp to the standing position.

In the second diagram underneath it, sealing path 18 is illustrated schematically in positive acceleration phase 15 and/or negative acceleration phase 16. It can be seen that sealing path 18 is during positive acceleration phase 15 increased and/or in negative acceleration phase 16 reduced in linear dependence on conveying speed 17 of film web 03. Due to this shortening or lengthening of sealing path 18 during positive acceleration phase 15 and/or during negative acceleration phase 16, it is achieved that sealing time 19 plotted schematically in the third diagram also remains essentially constant during the two acceleration phases 15 and/or 16. Due to this essentially constant sealing time 19 during which sealing jaws 09 are in contact with film web 03 at a constant sealing temperature and constant sealing pressure, sealing heat 20 introduced during the sealing of film web 03 is kept essentially constant, as illustrated schematically in the fourth diagram.

The invention claimed is:

1. A method for operating a tubular bag machine (01) comprising a film web (03) which is capable of being unwound from a supply reel (02), a forming shoulder (04) for forming the film web (03) into a film tube (05), a film take-off unit (07) acting against the film tube (05) and serving to move the film tube (05) further, a longitudinal sealing device for welding shut the film tube (05) parallel to its transport direction by means of a longitudinal seam, a transverse sealing device (08) which has transverse jaws (09) movable against one another and welding shut the film tube (05) transversely to the transport direction for producing transverse seams, a separating element (11) for separating finished tubular bags (10) from the film tube (05), the tubular bag machine (01) being accelerated in a positive acceleration phase (15) from an initial speed to a target speed when starting or being decelerated in a negative acceleration phase (16) from the target speed to a final speed for stopping, the method comprising:
during the positive acceleration phase or the negative acceleration phase, limiting a maximum acceleration or deceleration of the film web (03) in order to prevent tearing of the film web (03); and
during the limiting step, changing at least one sealing parameter (18, 19, 20) of the transverse jaws (09) as a function of the current conveying speed (17) of the film web (03), wherein maintaining a quality of the transverse seams created by the transverse jaws (09).

2. The method according to claim 1, wherein the sealing time (19) during which the transverse jaws (09) are in contact with the film web (03) is changed as a function of the current conveying speed (17) of the film web (03).

3. The method according to claim 1, wherein the sealing path (18) along which the transverse jaws (09) are in contact with the film web (03) is changed as a function of the current conveying speed (17) of the film web (03).

4. The method according to claim 1, wherein the sealing temperature with which the film web (03) is sealed by the transverse jaws (09) is changed as a function of the current conveying speed (17) of the film web (03).

5. The method according to claim 1, wherein the sealing pressure with which the film web (03) is sealed by the transverse jaws (09) is changed as a function of the current conveying speed (17) of the film web (03).

6. The method according to claim 1, wherein at least one sealing parameter (18, 19, 20) of the transverse jaws (09) for producing transverse seams is changed as a function of the current conveying speed (17) of the film web (03) in such a manner that the sealing heat (20) of the transverse jaws (09) into the transverse seams remains essentially constant.

7. The method according to claim 1, wherein the sealing pressure or the sealing temperature (19) remain unchanged in the positive or negative acceleration phase (15, 16), the sealing path (18) being changed as a function of the current conveying speed (17) of the film web (03) in such a manner that the sealing time remains essentially constant.

8. The method according to claim 1, wherein the sealing path (18) is changed in linear dependence on the current conveying speed (17) of the film web (03).

9. The method according to claim 1, wherein the tubular bag machine (01) is continuously driven during the production of the tubular bags (10).

10. The method according to claim 1, wherein the film web (03) contains a high proportion of paper.

11. The method according to claim 10, wherein the film web (03) contains a proportion of at least 95% paper.

* * * * *